May 6, 1958     B. A. JURGENSEN     2,833,000
MOBILE MILK ROOM

Filed Sept. 27, 1954     2 Sheets-Sheet 1

Bruce A. Jurgensen
INVENTOR.

May 6, 1958   B. A. JURGENSEN   2,833,000
MOBILE MILK ROOM
Filed Sept. 27, 1954   2 Sheets-Sheet 2
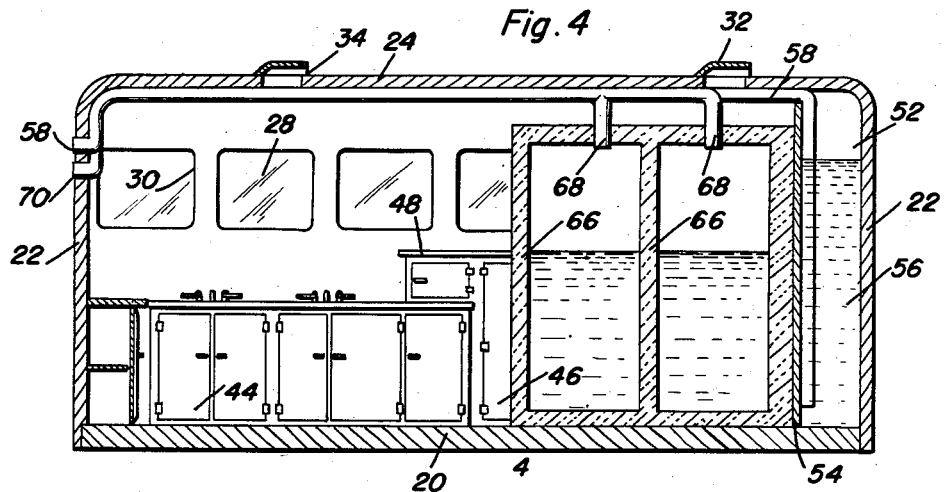
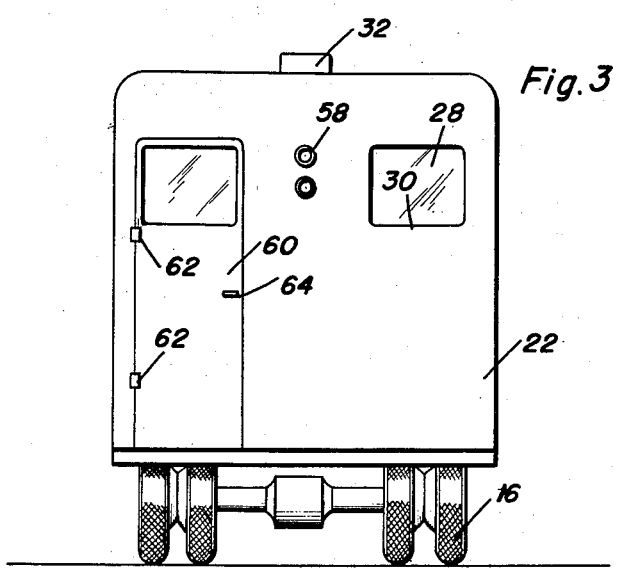
Bruce A. Jurgensen
INVENTOR.

2,833,000
Patented May 6, 1958

2,833,000

MOBILE MILK ROOM

Bruce A. Jurgensen, Astoria, Oreg.

Application September 27, 1954, Serial No. 458,360

1 Claim. (Cl. 20—2)

This invention relates to a mobile milk room, and more specifically provides a milk room for receiving the milk and treating the various milk utensils for cleanliness wherein the device is especially useful in conjunction with my copending application, Serial No. 607,812, filed September 4, 1956, for Mobile Milking Parlor, now abandoned.

An object of this invention is to provide a mobile milk room including a milk storage tank that may be refrigerated, a water storage tank, a heater for heating the water, sinks and faucets for cleaning the milking utensils with the heated water and drying racks for the cleaned utensils wherein the entire device is mounted upon a mobile frame, such as a vehicle in the nature of a truck or trailer, wherein the milk room may be easily and quickly moved and transported from one location to another for the purpose of receiving the milk, storing the milk and transporting the milk to a centralized location for processing.

A further object of the present invention is to provide a mobile milk room to be used in conjunction with the aforementioned mobile milking parlor wherein the milk from the milking parlor will be received in storage compartments and wherein the mobile milking room will eliminate the necessity for building a separate building for the milk cleaning equipment and the milk processing and cooling mechanism.

Still another important object of the present invention is to provide a mobile milk room which is simple in construction, easy to use, sanitary, easy to clean, well adapted for its intended purposes, and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2:
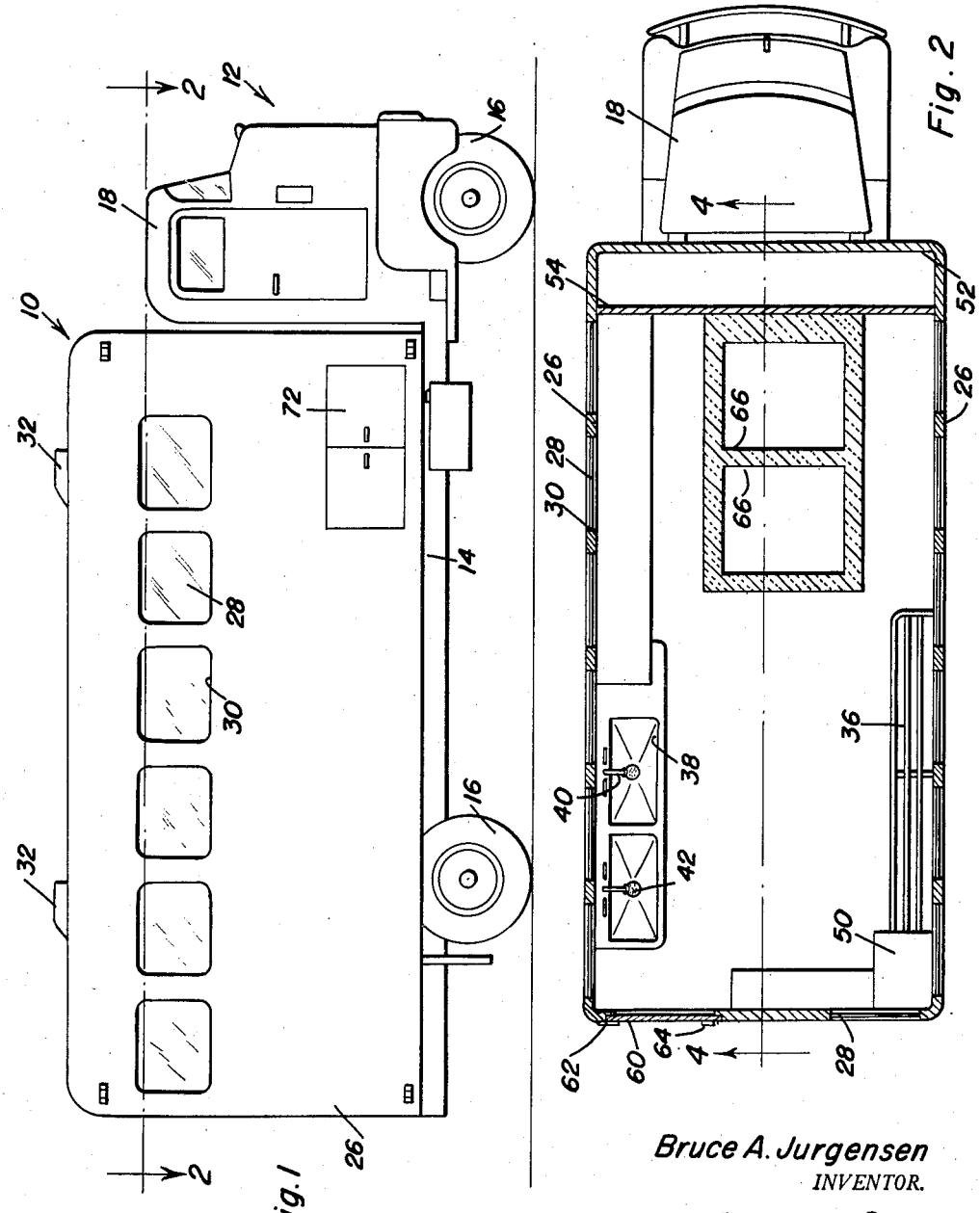
Figure 1 is a side elevational view showing the mobile milk room of the present invention mounted upon a truck chassis.
Figure 2 is a longitudinal, top plan sectional view taken substantially upon the plane of section line 2—2 of Figure 1, showing the various details of construction of the mobile milk room of the present invention.

Figure 3 is a rear end elevational view showing the milk and water inlet pipes and the access door for providing access into the interior of the mobile milk room housing; and Figure 4 is a longitudinal, vertical sectional view taken substantially upon the plane of section line 4—4 of Figure 2 showing additional structural details of the interior of the milk room and the relationship of the milk storage tanks and water storage tanks together with the cabinet locations and the sink and faucet positions.

Referring now specifically to the drawings, it will be seen that the numeral 10 generally designates the mobile milk room of the present invention that is mounted upon a vehicle generally designated by the numeral 12 and including longitudinal frame members 14 having ground engaging wheels 16 rotatably supported thereon with the rear ground engaging wheels 16 being driven by the usual motor and other mechanisms located in the cab 18 of the vehicle 12.

The mobile milk room 10 includes a housing having a bottom or floor 20, end walls 22, a roof or ceiling 24 and side walls 26. A plurality of windows 28 are positioned in openings 30 in spaced relation about the side walls 26 and the rear end wall 22 wherein light and air may be admitted into the interior of the milk room 10. Upwardly extending ventilators 32 are positioned in the ceiling 24 and vertically disposed openings 34 are positioned at the forward end of the ventilators 32 for communication with the outside atmosphere wherein the air within the housing is changed. Positioned adjacent one side wall 26 is an elongated rack 36 constructed of a plurality of longitudinally elongated and spaced rods for supporting milking utensils, as described hereinafter.

Adjacent the upper side wall 26 is a pair of sinks 38 having faucets 40 connected therewith with suitable drains 42 therein. Positioned below the sinks 38 are a plurality of cabinets 44 having the usual closure doors and positioned alongside the sinks 38 are a plurality of cabinets 46 having a counter top supporting surface 48. A hot water heater 50 is positioned in the rear corner of the milk room 10 for heating water positioned in a tank transversely of the forward portion of the housing, as indicated by the numeral 52. The tank 52 is formed by a transverse wall 54 extending parallel to and in spaced relation to the forward wall 22 wherein the water 56 is disposed in the tank 52 and a suitable conduit or pipe 58 is provided for filling the water tank 52 and suitable piping is provided for communicating the water 56 with the water heater 50 and the sink faucets 40.

A closure door 60 is provided in the rear end wall 22 and is mounted on suitable hinges 62 and provided with a latch 64, thereby providing access into the interior of the milk room 10 wherein the milking utensils may be cleaned and stored upon the drying racks 36.

A pair of tanks 66 is provided immediately rear of the transverse wall 54 for receiving and storing milk, and each of the tanks 66 is connected by a pipe 68 to an inlet pipe 70 that may be connected to the milk supply, such as the milking parlor of my copending application.

If desired, suitable refrigeration equipment, electrical generators, electric motors and other machinery may be positioned behind the small closure doors 72 located at the forward end of the milk room 10 so that the milk room 10 is entirely independent of any other power source and is self-contained. However, it will be understood that the device may have a suitable connection for connection to a power source, such as an electric line or the like.

In operation, the milk is stored within the tank 66 and the milk room 10 is moved by driving the vehicle 12 to unload the milk at a desired location.

The milk room can then be attached to a suitable power line for refrigeration and heating the water, and the water tank may be filled through the conduit 58. This saves excessive wear on the self-contained generator, if one is provided, thereby rendering the device long lasting and inexpensive in operation. This also eliminates the investment in a permanent building which is not versatile in its utility, inasmuch as the cows must be driven to the barn adjacent the milking room in order to transport the milk from the cows to the milk room and cool the milk prior to processing. This also provides an easily cleaned and efficient room for cleaning and sterilizing the various utensils utilized in milking, thereby rendering the task of maintaining the rigid cleanliness standards an easier task. It will be understood that the various components of the milk room are made of water impervious materials wherein the entire milk room 10 may be easily cleaned and maintained in a sanitary condition by washing the interior and the exterior of the device with any suitable cleansing agent. The use of this milk room eliminates the contact of the milk with many germs normally found in the milking operation due to the movement of the milk within a completely closed system, thereby eliminating the chance of contact with germ laden dust, human hands or the like.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A vehicle for receiving bulk milk for temporary storage and cooling comprising a wheeled frame, an enlarged enclosed body having vertical walls, a floor and a roof, the rear wall of the body having an access opening with closure door therein, said roof having ventilating openings with baffles overlying the openings in spaced relation to permit circulation of air, the side walls having windows to admit air and natural light into the enclosure, a plurality of sinks along one side wall, cabinets disposed below the sinks, faucets on said sinks, a hot water heater for heating water for cleaning milking utensils, a drying rack on the other side wall for supporting cleaned milking utensils, a pair of tanks within the enclosure for receiving and storing liquid bulk milk, an inlet pipe for each milk tank, each of said pipes extending to the exterior of the enclosure for filling the tanks with milk, and refrigeration equipment for cooling the milk, and a hot water tank including a transverse partition wall in spaced relation to the front wall of the enclosure for forming a compartment in the form of a tank extending transversely of the enclosure.

References Cited in the file of this patent

UNITED STATES PATENTS

| | | |
|---|---|---|
| 1,064,324 | Heyman | June 10, 1913 |
| 1,796,112 | McArthur | Mar. 10, 1931 |
| 2,022,324 | Schock | Nov. 26, 1935 |